United States Patent [19]

Takayama et al.

[11] Patent Number: 4,838,962
[45] Date of Patent: Jun. 13, 1989

[54] MAGNETO-OPTICAL RECORDING MEDIUM

[75] Inventors: Shinji Takayama, Mitaka; Fumiyoshi Kirino, Tokyo; Yutaka Sugita, Tokorozawa, all of Japan

[73] Assignee: Hitachi, Ltd., Tokyo, Japan

[21] Appl. No.: 206,813

[22] Filed: Jun. 15, 1988

Related U.S. Application Data

[63] Continuation of Ser. No. 883,762, Jul. 9, 1986, abandoned.

[30] Foreign Application Priority Data

Jul. 12, 1985 [JP] Japan ................... 60-152215

[51] Int. Cl.$^4$ ............................... H01F 1/04
[52] U.S. Cl. ................... 148/304; 420/83; 420/416; 420/435; 420/581; 428/928
[58] Field of Search ............ 148/304, 403; 420/83, 420/416, 435, 581; 365/113, 122; 360/131, 135; 428/928

[56] References Cited

U.S. PATENT DOCUMENTS

| | | | |
|---|---|---|---|
| 4,126,494 | 11/1978 | Imamura et al. | 148/101 |
| 4,152,486 | 5/1979 | Imamura et al. | 428/606 |
| 4,467,383 | 8/1984 | Chita et al. | 360/131 |
| 4,556,291 | 12/1985 | Chen | 360/377 |
| 4,569,381 | 2/1986 | Freese et al. | 428/213 |

FOREIGN PATENT DOCUMENTS

| | | | |
|---|---|---|---|
| 3317101 | 11/1983 | Fed. Rep. of Germany . | |
| 56-74843 | 1/1981 | Japan . | |
| 57-94948 | 6/1982 | Japan . | |
| 58-73746 | 5/1983 | Japan . | |
| 58-165306 | 9/1983 | Japan . | |
| 60-9855 | 1/1985 | Japan | 420/416 |
| 61-15308 | 1/1986 | Japan | 148/304 |
| 2071696 | 9/1981 | United Kingdom . | |

*Primary Examiner*—John P. Sheehan
*Attorney, Agent, or Firm*—Antonelli, Terry & Wands

[57] ABSTRACT

A magneto-optical recording medium comprising a perpendicularly magnetized amorphous film made of an alloy of the formula: $(R_{1-x} M_x)_a (Fe_{1-y} Co_y)_{100-a}$, wherein R is at least one of La, Ce, Pr, Nd, Sm, Ho, Er and Yb; M is at least one of Tb, Gd and Dy; $0 \leq x < 0.5$; $0 < y < 1$; and $10 \leq a \leq 40$, is large in the Kerr rotation angle, excellent in coercivity and affords a larger read output-to-noise ratio (C/N).

13 Claims, 5 Drawing Sheets

F I G. 1
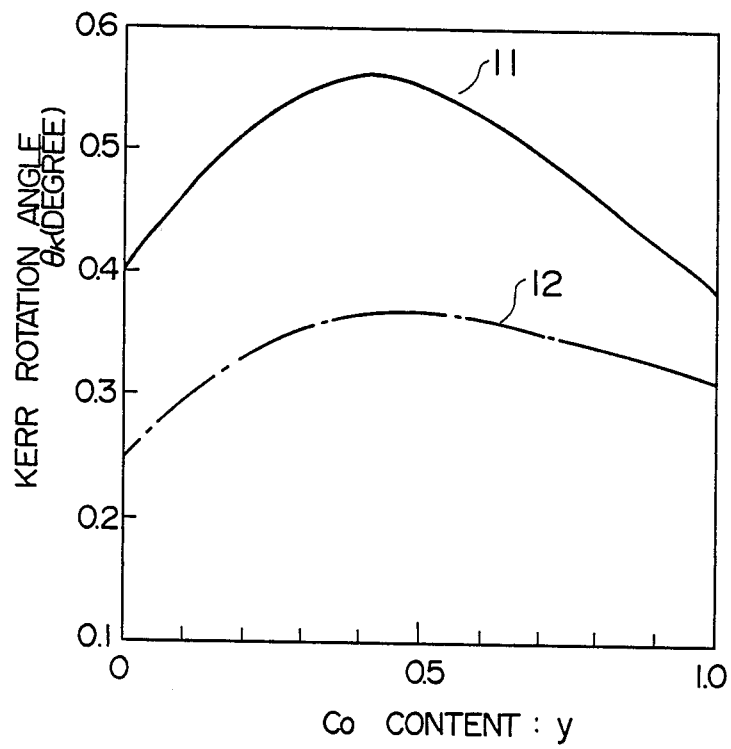

(a)

(b)

MAGNETO-OPTICAL RECORDING MEDIUM

This is a continuation of application Ser. No. 883,762, filed July 9, 1986, now abandoned.

BACKGROUND OF THE INVENTION

This invention relates to an erasable magneto-optical recording medium which is able to write, read and erase informations under the action of laser beam, and more particularly, it relates to a magneto-optical recording medium utilized for erasable magneto-optical recording.

Recently, attention has been increasingly paid to the magneto-optical recording in view of its high storage density, large storage capacity, arbitrary read-out, and reversible write/read. In magneto-optical recording, reversible magnetic domains are produced by irradiation of laser beam and bias external magnetic field on perpendicular magnetic thin films whose magnetization is perpendicular to the film surface. Corresponding to a direction of magnetization, two digital informations, such as "1" and "0", are recorded. Such recorded informations are read out by use of polar Kerr effect or Faraday effect.

Hitherto, perpendicular magnetic films such as rare-earth transition metal amorphous thin films have been proposed as a magneto-optical medium. The rare-earth-transition metal amorphous thin film (hereinafter referred to as "RE-TM amorphous film") has been considered to be suitable for a recording medium due to the following reasons: (1) it is a low noise medium because of no crystalline boundary in it, and (2) the ease of productivity of thin films in large area. The RE-TM amorphous films are disclosed, for example, in U.S. Pat. Nos. 4,126,494; 4,152,486; 4,569,881; 4,467,383; and 4,556,291; UK Patent Publication No. GB 2,071,696A; Japanese Kokai Patent Application Nos. 57-94948, 56-74843, and 58-73746; West German Offenlegungsschrift No. 3,317,101 Al; etc.

But, in the magneto-optical recording, since it is necessary to obtain sufficient read-out signals with a small recording domain in order to attain high speed and high density, the Kerr rotation angles in the magneto-optical recording films heretofore developed are still insufficient.

Among RE-TM amorphous films, relatively large Kerr rotation angles are obtained in amorphous films made of alloys using Tb element as a main rare-earth element such as Tb-Gd-Fe, Tb-Fe-Co, Tb-Gd-Fe-Co and the like alloys. But since the Tb element is expensive, there is a problem of making the cost of film per se higher.

SUMMARY OF THE INVENTION

It is an object of this invention to provide an amorphous magneto-optical recording medium which is sufficiently large in magneto-optical effects, high in read-out signals and suitable for practical use, and can be produced with a low cost.

This invention provides a magneto-optical recording medium comprising a substantially amorphous film made of an alloy represented by the formula:

$$(R_{1-x}M_x)_a(Fe_{1-y}Co_y)_{100-a} \qquad (1)$$

wherein R is at least one element selected from the group consisting of La, Ce, Pr, Nd, Sm, Ho, Er and Yb; M is at least one element selected from the group consisting of Tb, Dy and Gd; x and Y mean atomic ratios and a means an atomic percent, each satisfying the following conditions:

$$0 \leq x < 0.5$$

$$0 < y < 1$$

$$10 \leq a \leq 40$$

BRIEF DESCRIPTION OF THE DRAWINGS

FIGS. 1, 3 and 4 are graphs showing a relationship between the Kerr rotation angle and the Co content in amorphous films made of R-M-Fe-Co series alloys.

DESCRIPTION OF THE PREFERRED EMBODIMENTS

Figure 2:
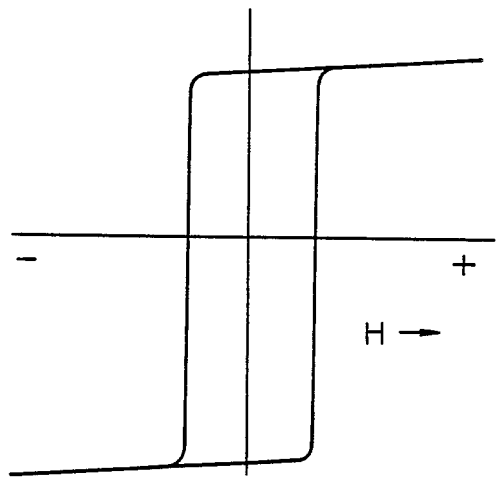
FIG. 2(a) shows Kerr hysterisis loop in the case of amorphous film of $(Nd_{0.7}Tb_{0.3})_{26}(Fe_{0.9}Co_{0.1})_{74}$
FIG. 2(b) shows Kerr hysterisis loop in the case of amorphous film of $Nd_{26}(Fe_{0.9}Co_{0.1})_{74}$.
Figure 2:
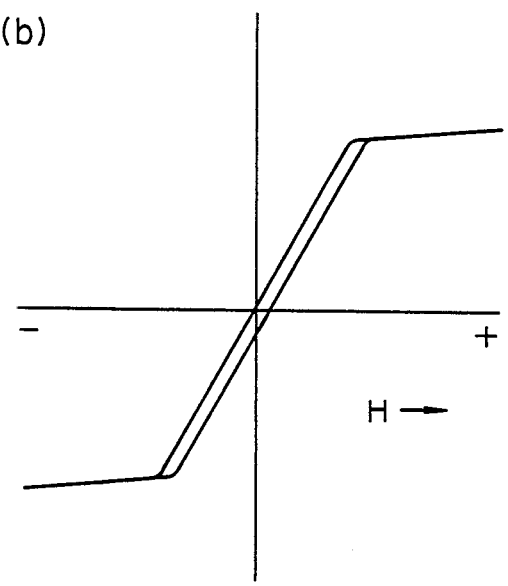

The present inventors have found that, in rare-earth-iron series amorphous films, perpendicular magnetizing films can be obtained from ternary alloy systems of R-Fe-Co wherein R is an element selected from La, Ce, Pr, Nd, Sm, Ho, Er and Yb, these elements being cheaper than Tb and the Kerr rotation angle $\theta_K$ of the films can be increased. But since these ternary alloy systems generally have coercivity $H_c$ of as low as about 0.3 $kO_e$ or less, stable formation of recorded bits by applying thermomagnetic characteristics is sometimes disturbed.

In such a case, when other rare-earth element having magnetic anisotropy with 4f electron orbital momentum L being not zero is added to these ternary alloy systems, there were obtained magneto-optical recording films having increased coercivity and being perpendicular magnetizing film with high $\theta_K$ and accomplished this invention.

It is known that an increase in the Kerr rotation angle causes an increase in a value of the product $\sqrt{R} \cdot \theta_K$ (wherein R is reflectivity and $\theta_K$ is a Kerr rotation angle). Since this value of the product is proportional to the read-out signal level, the magneto-optical recording medium of this invention can significantly improve a read-out S/N ratio.

The magneto-optical recording medium of this invention is made of at least a ternary alloy system represented by the formula:

$$(R_{1-x}M_x)_a(Fe_{1-y}Co_y)_{100-a} \qquad (1)$$

wherein R is at least one element selected from the group consisting of La, Ce, Pr, Nd, Sm, Ho, Er and Yb; and M is at least one element selected from the group consisting of Tb, Dy and Gd; x and y mean atomic ratios and a means an atomic percent, each satisfying the following conditions:

$$0 \leq x < 0.5$$

$$0 < y < 1$$

$$10 \leq a \leq 40$$

In the above alloy, the element R which contains more than a half of the rare-earth portion of the alloy composition causes an increase of the Kerr rotation angle and reduces the cost of production, and the element M of the alloy composition causes an increase of the coercive force.

In order to obtain perpendicular magnetizing films from the alloy mentioned above, it is necessary to make the total rare-earth element content "a" 10 to 40 atom percents. In order to obtain perpendicular magnetizing films having greater residual magnetization and better squareness of the Kerr hysterisis loop, it is preferable to make "a" 20 to 30 atom percents.

When Tb or Dy having a particularly large orbital momentum L is added to the ternary alloy system, there can be obtained a perpendicular magnetizing film having increased coercive force, and good squareness of the Kerr hysterisis loop but remarkably lowered Curie temperature and reduced Kerr rotation angle. Thus, it is necessary to make the atomic ratio "x" less than 0.5.

On the other hand, when Fe is replaced by Co in the alloy used in this invention, the Kerr rotation angle $\theta_K$ increases with an increase of the Co content and shows maximum near y=0.3 to 0.5, as in the case of conventional Tb - Fe - Co films. Since there is a tendency to increase the Kerr rotation angle $\theta_K$ by either replacing Fe by Co or Co by Fe, it is necessary to make the Co replacing amount "y" (in atomic ratio) in the above-mentioned formula (1) in the range of $0<y<1$, preferably $0.3 \leq y \leq 0.5$. Generally speaking, for the films in the Fe rich side composition their Curie temperatures Tc are used for writing (Curie point writing) mainly, while for the films in the Co rich composition, the compensation temperatures Tcomp (compensation point writing) are mainly used for writing due to too high Curie temperature. Therefore, in order to conduct the Curie point writing, "y" in the alloy composition of the formula (1) is $0<y<0.5$. But when y is 0.4 or more, there is a fear of causing a problem of incapability of writing by means of a semiconductor laser due to too high Tc. Thus, the value of y is preferably $0<y\leq 0.4$ in order to conduct the Curie point writing advantageously. On the other hand, in order to conduct the compensation point writing, "y" in the alloy composition of the formula (1) is $0.5<y<1$.

In order, to further improve recording sensitivity, corrosion resistance and life of the thin film of the alloy of the formula (1), it is effective to add one or more transition metals such as Al, Ti, Cr, Nb, Ta, Pt, etc., non-metallic elements such as B, C, Si, etc., in an amount of 10 atom percent or less.

Figure 5:
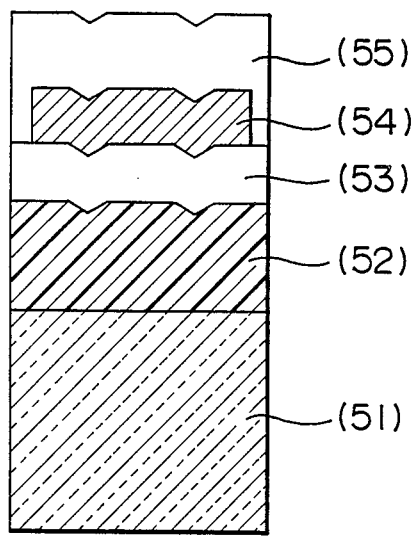
FIG. 5 is a cross-sectional view of one example of magneto-optical recording medium.

The amorphous thin film used for producing a magneto-optical recording medium can be produced by a conventional process such as evaporation or sputtering. The magneto-optical recording medium is practically used in the form of a magneto-optical disc with multiple layers comprising, for example, as shown in FIG. 5, a glass or polymer (e.g. epoxy) substrate (51) (e.g. 1.2 mm thick), a UV resin layer (52) (e.g. 30 μm), an interface layer (53) such as SiO or SiN (e.g. 0.1 μm), a recording magnetic layer (54) (e.g. 0.1 μm), and a protective layer (55) such as SiO or SiN (e.g. 0.15 μm). The thickness of each layer is determined so as to maximize the value of the product $\sqrt{R}\cdot\theta_K$ of the disc medium. In general, in the case of using polar Kerr rotation, the thickness of recording magnetic layer, i.e., RE-TM thin film of this invention, is usually 500 to 2000 Å.

This invention is illustrated by way of the following Examples.

EXAMPLE 1

Amorphous alloy films of this invention are produced by using a composite target obtained by positioning rear-earth elements or adding elements in an area of $5\times 5$ mm² on a Fe or Co circular plate of 110 mm in diameter so as to make the predetermined composition in an area ratio and by a magnetron-sputting method or a bias-sputtering method applying a negative bias voltage of $-20$ V to $-150$ V to a substrate. The amorphous alloy films can also be produced by preparing an alloy having a predetermined composition by vacuum arc dissolution and by conducting evaporation by using the resulting mother alloy.

FIG. 1 is a graph showing dependence of the Kerr rotation angle of amorphous films on the Co content measured at a wavelength ($\lambda$) of laser beam of 822 nm. In FIG. 1, the curve 11 is obtained by using an alloy represented by the formula: $(Nd_{0.7}Tb_{0.3})_{26}(Fe_{1-y}Co_y)_{74}$ and the curve 12 is obtained by using an alloy represented by the formula: $Tb_{26}(Fe_{1-y}Co_y)_{74}$.

As is clear from FIG. 1, a larger Kerr rotation angle $\theta_K$ can be obtained by replacing a part of Tb by Nd compared with a ternary alloy of $Tb_{26}(Fe_{1-y}Co_y)_{74}$.

FIG. 2(a) shows the Kerr hysterisis loop in the case of an amorphous film of $(Nd_{0.6}Tb_{0.4})_{26}(Fe_{0.84}Co_{0.16})_{74}$ and FIG. 2(b) shows the Kerr hysterisis loop in the case of an amorphous film of $Nd_{26}(Fe_{0.84}Co_{0.16})_{74}$. As is represented by FIG. 2, when Tb or Dy or Gd having a large orbital momentum L is added, there can be obtained a film suitable for magneto-optical material having an increaed coercive force and good squareness of the Kerr hysterisis loop. The above-mentioned results are the same when other alloy systems within the formula (1) are used.

Further, as shown in FIG. 1, the alloy of Nd-Tb-Fe-Co system has $\theta_K$ of 0.5° or more in the range of $0.15 \leq y \leq 0.7$; that is, a large $\theta_K$ can be obtained.

EXAMPLE 2

Amorphous thin films of this invention are produced by either an electron beam evaporation or a magnetron sputtering process. In the former evaporation method, mother alloys are first prepared by using an RF heating furnace, and then are subjected to evaporation on a glass substrate (10 mm in diameter) by using an electron beam evaporation apparatus from two separate sources under the circumstance of the background pressure of $1\times 10^{-7}$ Torr to $1\times 10^{-7}$ Torr during deposition. The deposition rate is 3-5 Å/sec. The film thickness is up to 0.1 μm. In the latter sputtering process, the RE-TM thin films (typically 0.1 μm thick) are sputtered on a glass substrate (10 mm in diameter) by using RF magnetron sputtering apparatus in an Ar atomsphere of $5\times 10^{-3}$ to $2\times 10^{-1}$ Torr. A composite trarget is used for the sputter deposition, which target contains rate-earth metals or transition metals ($10\times 10$ mm² chips) placed on a Co or Fe disk of 120 mm in diameter.

Figure 3:
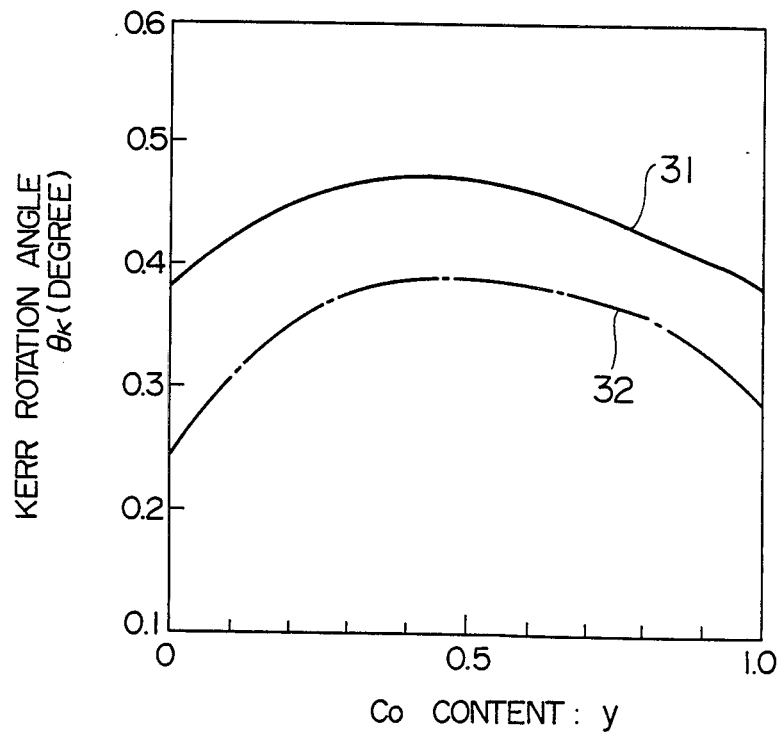

FIG. 3 is a graph showing the dependence of Kerr rotation angle on the Co content in two magneto-optical media measured at a wavelength of laser beam of 822 nm. Curve 31 is for $(Tb_{0.3}Sm_{0.7})_{21}(Fe_{1-y}Co_y)_{79}$ amorphous thin film produced by the evaporation method mentioned above. In the Figure, the results of $Tb_{21}(Fe_{1-y}Co_y)_{79}$ amorphous films are also shown by the curve 32. As is clear from FIG. 3, the Kerr rotation angle increases with the replacement of Tb by Sm. On the other hand, the reflectivity R does not significantly change, showing R=52-55% in the composition range of samples in FIG. 3. Thus, the value of product $\sqrt{R}\cdot\theta_k$ increases with the replacement of Tb by Sm, resulting in increasing a read-out carrier to noise ratio (C/N). Also, the Curie temperature of these samples are less than 250° C. in the range of y being less than 20%.

EXAMPLE 3

Figure 4:
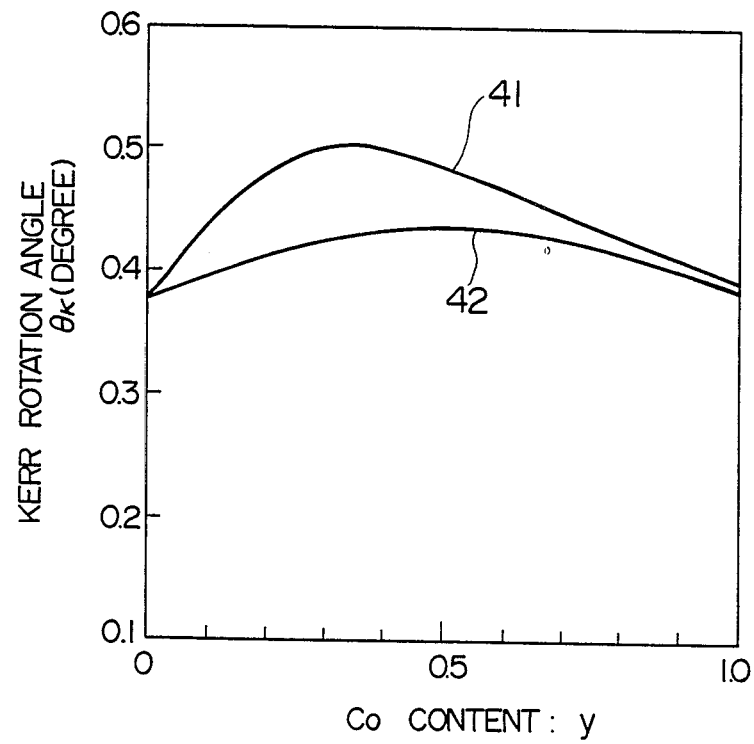

FIG. 4 is a graph showing the dependence of the Kerr rotation angle on the Co content in $(La_{0.6}Tb_{0.4})_{25}$-$(Fe_{1-y}Co_y)_{75}$ (the curve 41) and $(Ho_{0.6}Tb_{0.4})_{24}$-$(Fe_{1-y}Co_y)_{76}$ (the curve 42) amorphous films, respectively measured at a wavelength of leaser beam of 822 nm. In addition to the replacement among rare-earth elements, the Kerr rotation angle can be also maximized by the replacement of Fe by Co as shown in the Figure. Note that the Kerr rotation angle of La-Tb-Fe-Co reaches the maximum value of 0.5° at y=0.25 to 0.35. Thus, one can easily maximize properties of amorphous films for magneto-optical application by optimizing the amount of both replacement of rare-earth elements by other rare-earth elements and that of Fe by Co in the quaternary alloy systems of this invention.

EXAMPLE 4

Kerr rotation angles of representative amorphous magneto-optical media of this invention are listed in Table 1. These amorphous films can also be prepared by the RF magnetron sputtering process in a similar manner as in Example 1. Large Kerr rotation more than 0.4° is obtained in quaternary alloy systems. Magneto-optical disks having a diameter of 130 mm are produced by using these amorphous films listed in Table 1. The resulting disks show high C/N ratio of 50 to 55 dB under the conditions of recording frequency of 1 MHz and recording laser power of 5 to 11 mW.

As described above, the amorphous films of this invention have superior magneto-optical characteristics than conventional RE-TM amorphous films. It is obvious that one can further increase Kerr rotation and read-out carrier to noise ratio (C/N) in the form of multi layer media using the amorphous films of the this invention. Also, many modifications and variations of this invention are possible in the light of the above teaching.

TABLE 1

| Composition | Kerr rotation angle $\theta_k$ (deg) |
| --- | --- |
| $(Ce_{0.55}Tb_{0.45})_{20} (Fe_{0.7}Co_{0.3})_{80}$ | 0.43 |
| $(Pr_{0.6}Tb_{0.4})_{21} (Fe_{0.7}Co_{0.3})_{79}$ | 0.45 |
| $(Er_{0.55}Tb_{0.45})_{19} (Fe_{0.8}Co_{0.2})_{81}$ | 0.42 |
| $(Yb_{0.6}Tb_{0.4})_{20} (Fe_{0.7}Co_{0.3})_{80}$ | 0.40 |
| $(La_{0.6}Dy_{0.4})_{20} (Fe_{0.7}Co_{0.3})_{80}$ | 0.45 |
| $(Sm_{0.55}Dy_{0.45})_{20} (Fe_{0.8}Co_{0.2})_{80}$ | 0.45 |
| $(Ho_{0.6}Dy_{0.4})_{25} (Fe_{0.7}Co_{0.3})_{75}$ | 0.41 |
| $(Nd_{0.6}Dy_{0.4})_{24} (Fe_{0.7}Co_{0.3})_{76}$ | 0.42 |
| $(Ho_{0.6}Gd_{0.4})_{25} (Fe_{0.7}Co_{0.3})_{75}$ | 0.42 |
| $(Sm_{0.6}Gd_{0.4})_{20} (Fe_{0.7}Co_{0.3})_{80}$ | 0.53 |
| $(Nd_{0.6}Gd_{0.4})_{20} (Fe_{0.7}Co_{0.3})_{80}$ | 0.55 |

What is claimed is:

1. A magneto-optical recording medium comprising a substantially amorphous film exhibiting increased coercivity, being a perpendicular magnetizing film, and being made of an alloy represented by the formula:

$$(R_{1-x}M_x)_a(Fe_{1-y}Co_y)_{100-a} \tag{1}$$

wherein R is at least one element selected from the group consisting of La, Ce, PR, Nd, Sm and Yb; M is at least one element selected from the group consisting of Tb, Dy and Gd; x and y mean atomic ratios; and a means an atomic percent, each satisfying the following conditions:

$0 \leq x < 0.5$ $0 < y < 1$ $20 \leq a \leq 30$.

2. A magneto-optical recording medium according to claim 1, wherein R in the formula (1) comprises at least two elements.

3. A magneto-optical recording medium according to claim 1, wherein x in the formula (1) is in the range of $0 < x < 0.5$.

4. A magneto-optical recording medium according to claim 3, wherein R in the formula (1) is Nd.

5. A magneto-optical recording medium according to claim 3, wherein R in the formula (1) is Sm.

6. A magneto-optical recording medium according to claim 3, wherein R in the formula (1) is Ho.

7. A magneto-optical recording medium according to claim 1, wherein the alloy is a quaternary alloy of Sm-Tb-Fe-Co.

8. A magneto-optical recording medium according to claim 1, wherein the alloy is a quaternary alloy of Nd-Tb-Fe-Co.

9. A magneto-optical recording medium according to claim 1, wherein the alloy is a quaternary alloy of Ho-Tb-Fe-Co.

10. A magneto-optical recording medium according to claim 1, wherein the alloy is a quaternary alloy of Sm-Gd-Fe-Co.

11. A magneto-optical recording medium comprising a substantially amorphous film exhibiting increased coercivity, being a perpendicular magnetizing film, and being made of an alloy represented by the formula:

$$(R_{1-x}M_x)_a(Fe_{1-y}Co_y)_{100-a} \tag{1}$$

wherein R is at least one element selected from the group consisting of La, Ce, Pr, Nd, Sm, Ho, Er and Yb; M is at least one element selected from the group consisting of Tb and Gd; x and y represent atomic ratios; and a represents atomic percent, each satisfying the following conditions:

$0 \leq x < 0.5$ $0 < y < 1$ $20 \leq a \leq 30$.

12. A magneto-optical recording medium according to claim 11, wherein the alloy is a quaternary alloy of Ho-Gd-Fe-Co.

13. A magneto-optical recording medium comprising a substantially amorphous film exhibiting increased coercivity, being a perpendicular magnetizing film, and being made of an alloy represented by the formula:

$$(R_{1-x}M_x)_a(Fe_{1-y}Co_y)_{100-a} \tag{1}$$

wherein R is at least one element selected from the group consisting of Nd, Sm and Ho; M is at least one element selected from the group consisting of Tb and Gd; x and y represent atomic ratios; and a represents atomic percent, each satisfying the following conditions:

$0 \leq x < 0.5$ $0 < y < 1$ $20 \leq a \leq 30.$

* * * * *